United States Patent [19]

Kelley et al.

[11] 4,218,763
[45] Aug. 19, 1980

[54] ELECTRONIC ALARM SIGNALING SYSTEM

[76] Inventors: Ishmael C. Kelley, 6625 Piney Br. Rd. N.W., Washington, D.C. 20012; Lawrence J. Brailsford, 500-23rd St. N.W., Washington, D.C. 20037

[21] Appl. No.: 931,276

[22] Filed: Aug. 4, 1978

[51] Int. Cl.$^2$ ............................................. G08B 13/00
[52] U.S. Cl. ..................................... 340/65; 340/539; 340/541; 455/99
[58] Field of Search ................... 340/63, 65, 506, 512, 340/531, 534, 539, 541; 325/55, 111, 117

[56] References Cited

U.S. PATENT DOCUMENTS

| | | | |
|---|---|---|---|
| 2,979,706 | 4/1961 | Simon et al. | 340/539 |
| 3,230,454 | 1/1966 | Van Burkleo | 340/539 |
| 3,795,896 | 3/1974 | Isaacs | 340/539 |

Primary Examiner—Alvin H. Waring
Attorney, Agent, or Firm—Sherman & Shalloway

[57] ABSTRACT

A controlled electronic alarm signaling system, installed in a vehicle, or other property. The system has a transmitter which broadcasts a coded signal to a companion coded receiving device carried by an authorized person or installed at an authorized remote location. The transmission, which is of limited duration, occurs in response to tampering sensors located on the vehicle or other property which are connected to a control unit. Optionally, the control unit has the capability of switching on audible, visual and mechanical devices installed in the vehicle or other property for deterring and preventing theft, attempted theft, unauthorized entry and tampering. The transmitter is specifically tuned and uniquely coded to a receiving device which, having been activated, will in turn cause audible and other devices to be activated. A magnetic tape player with a speaker connected to the vehicle or other property sounds a warning message. Switching devices, which, when closed, opened, or delayed, activate the vehicle's or other properties' lights, horn, and antenna. The control unit for this system can be programmed by selective wiring for different functions and is installed inside of the vehicle or other property. The entire system is controlled by one 3-position toggle switch mounted inside the vehicle or other property. Provision for an auxiliary power supply is also employed.

39 Claims, 4 Drawing Figures

ELECTRONIC ALARM SIGNALING SYSTEM

BACKGROUND OF THE INVENTION

1. Field of the Invention

This invention relates to a warning device for the protection of vehicles and other properties and their contents against unauthorized entry using audio frequencies, radio frequencies and other mechanical devices. In particular, it relates to the type of alarm system which will call attention to an unauthorized entry to a vehicle or property and signal an authority upon the occasion of such entry.

2. Description of the Prior Art

There are many alarm devices in use today. They vary from the simple sounding of a vehicle's horn to more sophisticated devices which sound horns, turn on lights, and activate computers to perform various functions.

U.S. Pat. No. 4,074,244 discloses an audible-visual warning alarm system with multiple liquid level sensing devices including an optional voice input connected to the speaker through which the audible signals are made available.

A remotely controlled alarm system wherein a supervisory transmitter is normally energized, transmitting to a supervisory receiver is disclosed in U.S. Pat. No. 3,631,433. If the power fails or other tampering occurs, the supervisory transmitter stops transmitting and the supervisory receiver stops receiving, at which time a trouble indicator is activated.

U.S. Pat. Nos. 3,581,014 and 3,925,751 are examples of alarm systems which employ voice warning generators providing a recorded signal indicating an alarm.

3. Objectives, Criteria and Technical Considerations of the Invention

The inventors conducted a serious research into the methods and occasions of the theft and unauthorized entry of personal and real property. In keeping with their inquiry, particular attention was given to the theft of CB radios from vehicles, contents of motor and rail freight carriers, and personal property from homes and offices. It was found that it takes a short amount of time for knowledgeable, unauthorized persons to gain information on how the prior art alarm devices operate, and such person can, in turn, deviate or alter designed functions of the prior art alarm devices. It is, therefore, the object of this invention to give notice to an authority when unauthorized entry to a property is made, and further, to simultaneously give notice at the property site of the unauthorized entry.

Several factors, including the following, were taken under consideration in the development of this device:

(1) the ability of knowledgeable theives to cut power cables to a vehicle or other property, thereby deactivating the entire system's ability to perform, allowing the deactivation of the property's alarm system, followed by the reconnection or "jumping" of the power supply in order to make the property operational again;

(2) the problems related to radio signals wherein a signal from an unknown transmitter activates a receiving alarm device;

(3) the physical and phychological responses of a person making an unauthorized entry to a vehicle or other property when an on-site notice is given of such entry; (4) physical and psychological responses of an authorized person upon the receipt of a signal of an unauthorized entry;

(5) electronic safety precautions and regulations effecting the promulgation of radio waves (As a result of considering electronic safety, the components of this invention are activated by negative currents, and current blocking devices are installed to prevent accidental "shorts" that would effect the performance of this invention or the performance of the vehicle or property to which it is attached. And, in the case of the transmitting of radio frequencies, the transmitter must be turned off within authorized allocated time, regardless to the circuits activation by authorization, accident, or by a phenomenon); and (6) one interior console switch to control all authorized and unauthorized entry, which in one of three positions could turn the device "off", set the device in a mode for sending a radio signal to an authority, and set the device in a mode for sending a radio signal to an authority and at the same time create audible and mechanical activity at the property site.

Finally, a tangent object of this invention evolved from the inventor's inquiries into the areas which this device would affect, i.e., radio, television, CB, aircraft, police, fire and marine, and other ratio type communicating facilities, and the community as a whole. The object in this regard is to provide an alarm system which does not interfere with any other of these facilities, but rather, in addition to notifying the owner of the unauthorized entry, is also capable of notifying other authorities of a distress situation. For example, a blinking light or radio signal by a vehicle restrained by snow, flood, etc., can be received by police, airline pilots, forest rangers, CB's, or neighbors.

The primary objective of this invention is to provide a warning system which will notify an authority when an unauthorized entry is made to a vehicle, its contents or other property, and at the same time call attention to such unauthorized entry at the vehicle or other property site.

To satisfy these and other objectives of this invention, the following criteria is established and fulfilled by the invention disclosed herein:

(1) That the device would serve as a warning and signaling system for the protection of life and property and facilitate the social process of deterring and preventing crime;

(2) That the device in every respect satisfy safety rules and regulations promulgated by such agencies as the Federal Communications Commission, local fire and police authorities, and city ordinances, and that the device should not be a nuisance to these and other authorities or to the peace and tranquility of a neighborhood;

(3) That the device be economical to manufacture and install;

(4) That, in addition to economic manufacturing and installation cost, it should require a minimum amount of maintenance;

(5) That the control unit be small in size and portable and transferable from one vehicle or property to another vehicle or property with a minimum labor factor; and (6) That the device should be simple to operate.

Following this criteria, it is an objective of this invention to promulgate a radio signal in the atmosphere to a companion receiving device carried by an authorized person or installed at a remote authorized location when an unauthorized entry is made to a property, and in so doing, give notice at both locations.

In keeping with the aforementioned, it is an objective of this device to use a transmitted, coded radio signal which will activate its companion receiving device and that receiving device only, i.e., the coded signal emitted by one transmitter will not activate an alarm connected to any other receiver used for this purpose.

It is an objective of this invention to provide a switching system which can be "programmed" to the needs of an individual vehicle or other property.

Also, an object of this invention provides for the use of the ordinary security keys used in the normal and ordinary use of a vehicle or other property, and since the device is installed inside of the vehicle or other property, it does not require an individual security key.

In addition to the foregoing, it is an objective of this invention to provide a property owner with instant information upon the occurrence of an unauthorized entry or attempt of entry to a vehicle or other property. This is particularly important, in order that such information can be quickly transmitted to the police and other authorities.

Furthermore, it is the objective of this invention to provide a remote warning and signaling system which will allow for the installation of many coded receiving devices mounted on a console or panel so that one central authority can monitor signals of unauthorized entry from transmitters installed in vehicles and other properties at different locations.

SUMMARY OF THE INVENTION

An electronic signaling system is described wherein a control unit having a plurality of connectors, switches and delays controls the functions and actions of the system. The invention is specifically described with regard to its application as a vehicle alarm system, in which case, a 12-volt DC battery which is used in the vehicle is employed as the primary source. An auxiliary 12-volt DC power supply may be used in conjunction therewith. The auxiliary power supply is preferably installed in the vehicle in a place inaccessible to exterior interruption. The auxiliary power supply becomes operational by use of a transistorized switching device which becomes operational upon failure of the primary power supply. The auxiliary power supply may also be used as an emergency power supply for the vehicle.

A plurality of tampering sensors, such as door switches, trunk switches, hood switches and motion sensors, are located about the vehicle and connected to the control unit. When a sensor detects tampering, the control unit activates a transmitter and a transmitting antenna which broadcasts, for a short duration, a signal indicating tampering. The signal is received by a receiving unit which includes a receiving antenna, a receiver tuned to the transmitter, a receiver alarm and a power supply. The receiver alarm, which may be audible, visual, or vibrational, is activated whenever the receiver receives a signal from the transmitter. Thus, the receiver alarm notifies the proper authority of tampering so that further action can be taken immediately.

Optionally, the control unit may include connections to a tape player and speaker, the lights of the vehicle and the horn of the vehicle. Upon tampering, the control unit would sound the horn or other sounding device intermittently for a short period of time to discourage further tampering. Similarly, the control unit would blink the lights of the vehicle for a limited period of time and then automatically shut the lights off. The tape player and speaker, which is also activated by the control unit, would be installed in the vehicle passenger compartment and provide an audible signal, such as "attention-attention-the owner of this property has been signaled." After repeating the message several times, the control unit would shut off the tape player and speaker.

It is also contemplated that the transmitting antenna connected to the transmitter may be of an automatic type which emerges from the vehicle upon tampering, in order to transmit a signal to the companion receiving device and automatically recedes at the end of the transmission period.

BRIEF DESCRIPTION OF THE DRAWINGS

These objects and features of the invention as well as others will become apparent to those skilled in the art by referring to the accompanying drawings in which.

DETAILED DESCRIPTION OF THE INVENTION

Figure 1:
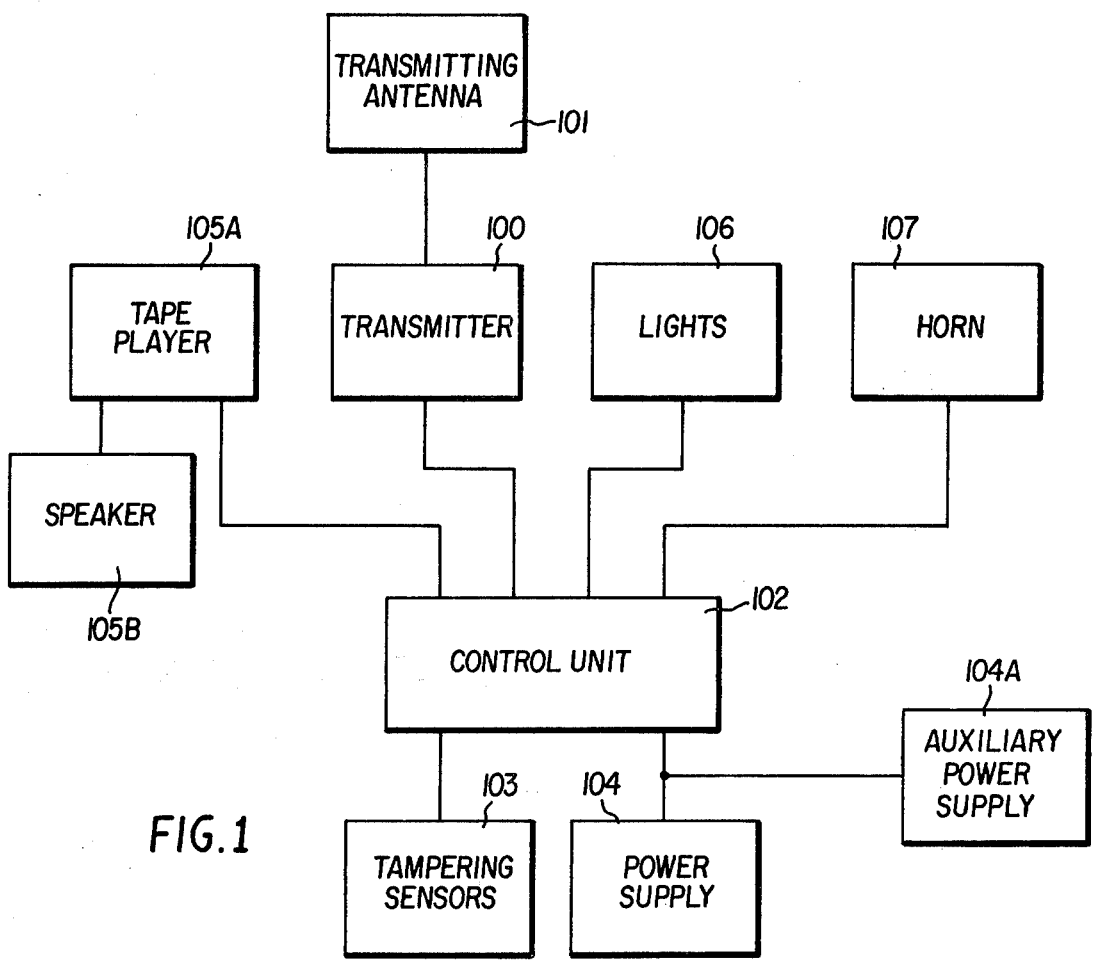
FIG. 1 is a block diagram of the vehicle alarm system.
Figure 2:
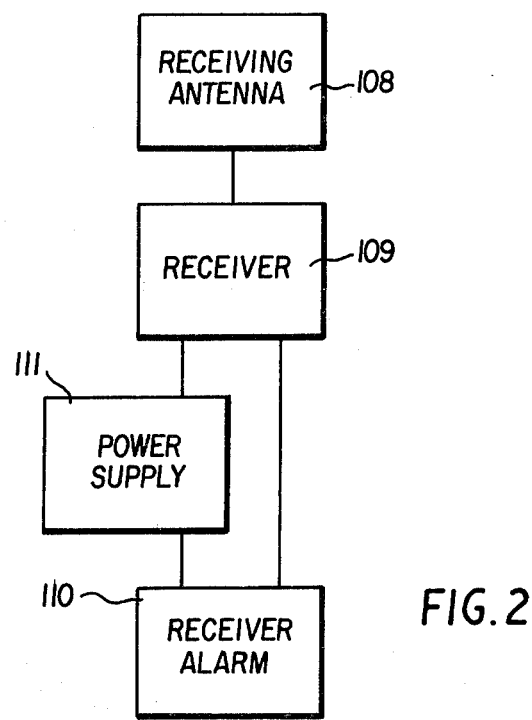
FIG. 2 is a block diagram of the receiving device of the invention.

The functional aspects of the invention can best be appreciated by referring to the block diagrams of FIGS. 1 and 2. In particular, FIG. 1 illustrates the block functions of the alarm system as it would be employed in a vehicle application. The vehicle would include a number of tampering sensors 103 conveniently located about the vehicle. The sensors may be of any known type which would monitor and indicate the improper entry, movement of tampering of the vehicle. For example, door sensors may be located on the door which would indicate opening of the door or other unauthorized movement of the door. Alternatively, motion sensors may be located on the hood or trunk lid monitoring the movement of the hood and trunk lid. Additionally, sensing systems could be employed in combination with the windows and windshield to monitor and sense breakage or forced movement. Mercury switches are especially useful in this regard.

The tampering sensors 103 are connected to a control unit which functions to control activation of the system by connection with a power supply 104. An auxiliary power supply 104A is also contemplated and may be used in conjunction with the primary power supply 104. In general, the auxiliary power supply is held in a standby condition and used only in situations when the primary power supply 104 is not properly functioning. A simple switching arrangement connecting the power supply 104 and auxiliary power supply 104A to the control 102 would effect this operation of the auxiliary power supply 104A.

The control unit 102 includes a switching arrangement which allows the individual controlling the alarm system to select the type of mode within which the alarm system should operate. Generally, three modes are contemplated. The first mode is the off condition wherein the alarm system is not functioning. The second mode is the limited mode wherein the alarm system functions to a limited degree, and the third mode is an unlimited mode wherein the alarm system functions in every degree.

When the tampering sensors 103 indicate some unauthorized activity is occurring, and the alarm system is in an activated mode, the control unit 102 begins operation of the alarm system. In particular, the power supply 104 is connected to the transmitter 100, and transmitting antenna 101 is activated for a limited period of time to transmit the pulsed selective calling circuits of the transmitter 100 through the transmitting antenna 101. In general, the transmitter 100 may be any available type of transmitter which operates within the frequency bands specified by the Federal Communications Commission for use with alarm systems or other radio controlled devices. Presently, such bands are in the 27 MHz range. The transmitter 100 would transmit a broadcast signal through the transmitting antenna 101 to the receiver system shown in FIG. 2. The broadcast signal would be incoded into the transmitter to correspond to the decoding characteristics of a receiver 109 which would be permitted to receive the signal through a receiving antenna 108. During the period that the alarm system is in an activated mode, the receiving system of FIG. 2 is carried by an authorized person and a power supply 111 is connected to the receiver 109 to permit continuous reception. When the coded signal from the alarm system of FIG. 1 is received by the receiving antenna 108 and decoded by the receiver 109, the receiver automatically triggers receiver alarm 110 to notify the authorized person carrying the receiver system that the tampering sensors 103 have indicated an unauthorized condition in the vehicle.

It is known and contemplated that activation of the transmitter 100 is the minimum requirement in the limited mode of operation of the alarm system. In the unlimited mode of operation, the control unit 102 also activates tape player 105A with speaker 105B and the vehicle lights 106 and the vehicle horn 107. As in the case of the transmitter 100, wherein activation is for a limited period of time, the invention described herein is also configured to activate the other devices for a limited period of time.

The tape player 105A may be an auxiliary system which is specifically connected to only the alarm or may be a built-in system in the vehicle. The speaker 105B may be the passenger compartment speaker located in the vehicle and used by the radio and/or tape player or may be an additional speaker located externally to the vehicle. When the control unit 102 activates the tape player 105A, a recorded message is automatically repeated during the period of activation on the speaker 105B. In other words, the tape player 105A is in a ready condition and activation by the control unit 102 results in audible signals being created from the tape player 105A through the speaker 105B. Such type of signals may range from verbal notices on tape to notify the unauthorized individuals that the alarm system has signaled the vehicle owner that unauthorized entry has occurred. On the other hand, the verbal message carried by the tape could be a signal to other individuals in the near vacinity that tampering has occurred. In this regard, the vehicle lights 106 and vehicle horn 107 are also turned on intermittently by the control unit 102 during the period of activation of the alarm system. This further enhances the deterrance of further unauthorized tampering and provides the ability to notify individuals in the near vacinity of the vehicle that tampering has occurred.

Although the embodiments and descriptions of the operations of this invention set forth herein describe its operations applied to a vehicle, its operations can be applied to a number of other properties. For example, the device can be employed to protect a sub-contractor's on-the-job equipment. It can also be used to protect a home, office, or beach home, or any of the individual personal properties located therein or there about. The device can serve as a warning device for boat owners when unauthorized entry is made; and further, it can warn boat owners when tie lines become loose or unstable because of weather conditions or other phenomenon. In other words, this device can be employed to protect almost any type of real or personal property.

DESCRIPTION OF THE PREFERRED EMBODIMENT

The alarm system of the preferred embodiment requires a "pocket size" receiving device, as shown in FIG. 2, capable of being carried by a person or installed in a console, which will sound a "beep" tone when it receives a coded signal broadcast through the atmosphere from its companion transmitter 100. One feature of this receiving device is that, once having been activated to sound an alarm, the alarm can be deactivated only by an authorized person or other authority. The power supply required for this receiving device is of low DC voltage, using replaceable or rechargeable standard batteries.

Figure 3:
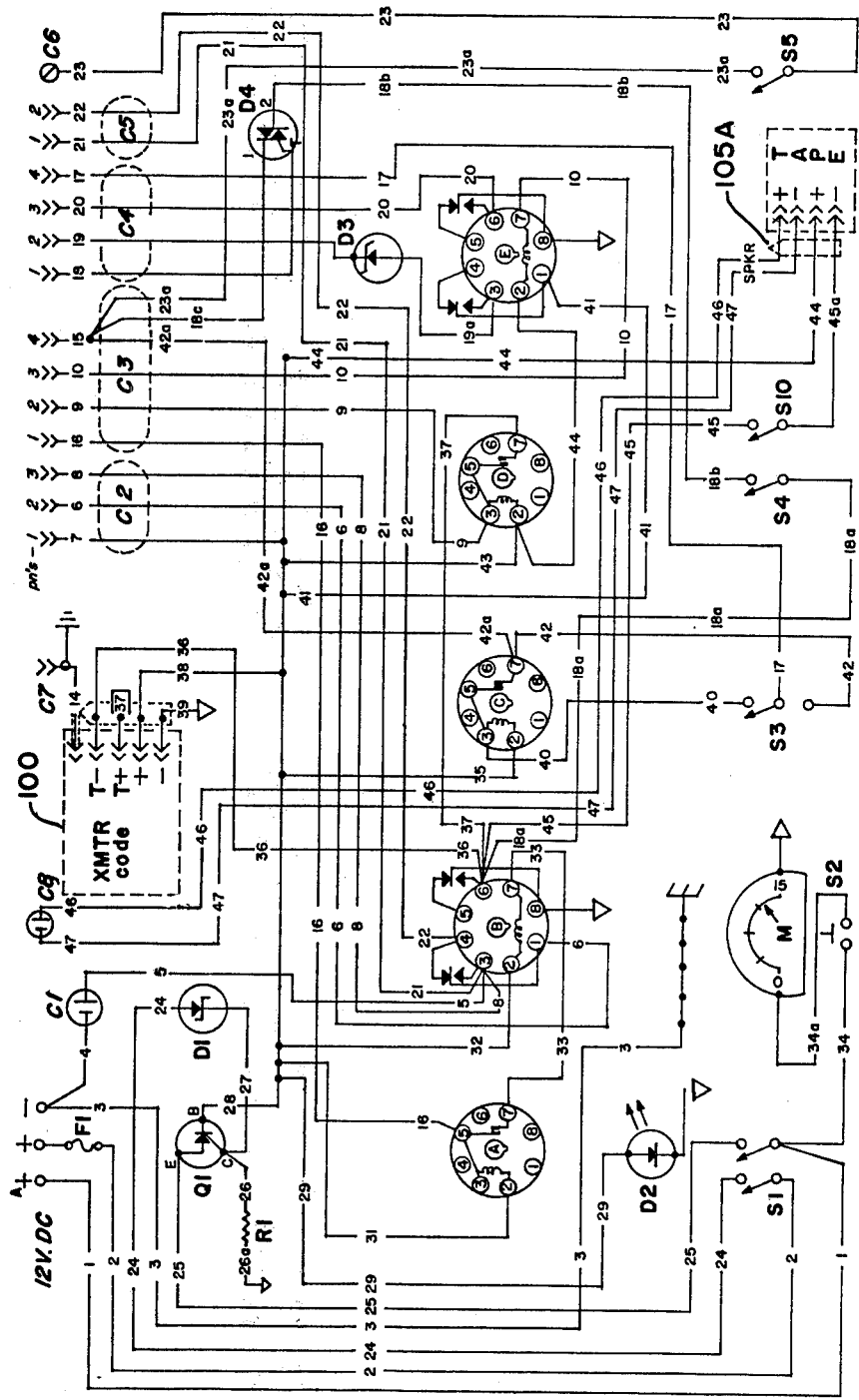
FIGS. 3 and 4 are schematic diagrams of the vehicle alarm system shown in FIG. 1.

As indicated in FIG. 3, the power supply of this device uses the 12-volt battery B1 already installed in a vehicle. However, an auxiliary 12-volt DC power supply B2 is recommended to operate in conjunction with the vehicle's power supply and additional power supply B2 should be installed in the vehicle in a place inaccessible to exterior interruption. Further, this auxiliary power supply B2 is not used in the normal operations of the device or the vehicle, but rather, by using a transistorized switching device, it becomes operational only after a failure on the part of the vehicle's normal power supply B1. This prevents knowledgeable thieves from cutting the negative cable connecting the battery of the vehicle to the engine block from the exposed, underside of the vehicle and thereby deactivating the entire electrical system of the vehicle.

Moreover, the auxiliary battery can be used as an emergency power supply for the vehicle when the vehicle's battery will not function as is in the case with many motorists during adverse weather conditions and maintenance neglect.

Figure 4:
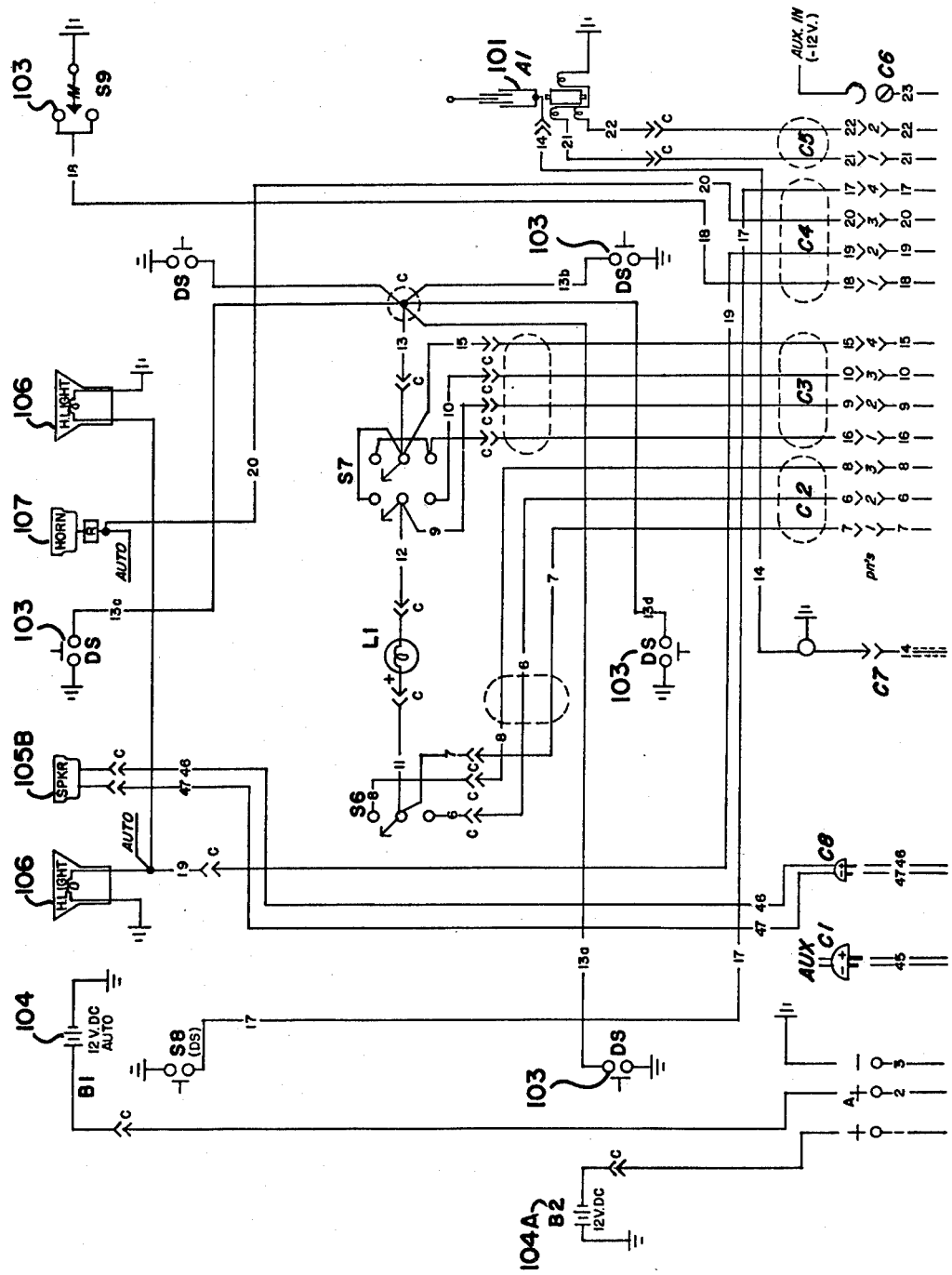

Essentially, FIGS. 3 and 4 are the schematic design of the central control unit 102 which contains the coded transmitter 100, the tape player 105A, a voltage indicator device, vacuum tubes and relays, circuit blocking and delaying devices, a light indicator device M, and various manual switches to "program" the unit to the satisfaction of the authorized user. The schematic presented in FIGS. 3 and 4 illustrates the connections of the various parts and functions exhibited therein.

The central control unit 102 is of compact size with chassis mounted connectors so that the unit can be easily disconnected from its installation in one property and reinstalled in another.

The transmitter 100 for this device, which is installed in the central control unit, operates in the 27 MHz range (or other assigned frequency prescribed by the FCC) with a power of 4 or less watts. The transmitter 100 facilitates the use of coded tones on a carrier wave with varying frequencies and durations of said tones to activate its companion receiver 109. The receiver 109 is, of course, activated by that exact tone transmission activity.

In addition to the controls built into the central control unit 102, which will shut off the entire alarm system, it will independently discontinue broadcasting a signal after approximately twenty seconds. The power supply 104 for this transmitting device is derived from the central control unit 102.

Although any length of wire or other materials (such as an ordinary automobile antenna) extended in length to satisfy the frequency required by the transmitter installed in the device will suffice, a preferred embodiment is the use of a motor driven transmitting antenna system 101 which, when activated, will extend to the correct broadcasting length when commanded by the central control unit 102. Automatically, when the extended antenna has performed its function, it retracts to a secure position inside the vehicle. The movement of extension and retraction by the transmitting antenna 101 also serves as an onsite warning device to the unauthorized intruder. It should be pointed out that the transmitting antenna 101 of the alarm system can be used by CB operators with a minimum amount of adjustment to the antenna regulation length, and the installation of a simple antenna up-down toggle switch. The control unit 102 provides for this activity without interfering with its prescribed function. Further, the use of such interior or console switching is accommodated for in the circuits within the central control unit 102 of this device. Furthermore, the employment of the CB operation will not interfere with the operations of the alarm system.

The lights 106 of the vehicle, such as the headlights, are connected by a positive circuit to the central control unit 102 which causes them (or others) to flash intermittently for a period of time. The central control unit 102 will automatically cause them to shut off to prevent unnecessary battery drain.

The relay of a horn 107 in the vehicle is connected by a negative circuit to the central control unit 102 of control unit 102 and will cause the horn to sound intermittently as is the case with the lights 106 above.

Upon receiving a current from the central control unit 102, the tape player 105A, which may be installed within the configurations of the central control unit 102, will become activated and sound a prerecorded message through a speaker 105B mounted under the hood of the vehicle. The preferred message is "attention.attention.-the owner of this property has been signaled." Obviously, any message can be transcribed, but since this is a theft prevention device, it is recommended that any prerecorded tape module be confined to this particular audio activity.

The intermittent action of the horn and lights is accomplished by tube relay E. It is contemplated that relay E may be replaced by a circuit which will intermittently signal the lights and sound the horn in an "SOS" pattern. Alternatively, relay E may be connected to an SOS-type signaling system.

TABLE 1

| Item | Description |
| --- | --- |
| B1 | Battery, 12-volt Auto |
| B2 | Batery A 12 volt (optional auxiliary source) |
| 01 | Transistor, 100W Sil.Amp.S. (RS-2040) Relay Tubes |
| A | 20 Second Delay N.C. (normally closed) 12 volt (12 C 20) |
| B | DPDT (double pole, double throw switch) 12 volt relay |

TABLE 1-continued

| Item | Description |
| --- | --- |
| C | 20 Sec. Delay N.O. (normally open) 12 volt (12 0 20) |
| D | Flasher (60 per Min.) 12 volt |
| E | DPDT 12 volt relay |
| R1 | Resistor, 270 ohms |
| D1 | 12-volt Zener Diode, 5 watt |
| D2 | 12-volt LED (light emitting diode) |
| D3 | 12-volt Zener, 5 watt |
| D4 | 1,000-volt SCR (silicon controlled rectifier), Triac |
| F1 | Fuse 15 Amp. |
| XMTR | Transmitter 26.995 MHz 4 watt, Code Differential: $(9)^9 \times (9)^9$ |
| A1 | Antenna, Telescopic with frequency adjustable, Motor-Fwd. Rev. |
| L1 | Auto Panel Lamp, 12-V DC Filament Lamp |
| M | Meter, 0–15v DC display |
| TAPE | Tape cassette player, 12V |
| SPKR | Speaker, 8 ohm, waterproof |
| S1 | Toggle Switch, DPDT |
| S2 | Miniature, SPST (single pole, single throw switch), Momentary Contact |
| S3 | Toggle Switch, SPDT |
| S4 | Toggle Switch, SPST |
| S5 | Toggle Switch, SPST |
| S6 | Auto Panel Switch, SPDT |
| S7 | Auto Panel Switch, DPDT |
| S8 | Auto Door Switch N.O. |
| S9 | Motion Switch (Adjustable) N.O. |
| S10 | Connector, 2 Pins Ch-Mt. (chassis mount) |
| DS'S | Auto Door Switches, N.O. |
| C'S | Cable connectors, solderless, M-F (male-female) as indicated |
| C1 | Connector 2 Pins Ch-Mt. |
| C2 | Connector, 3 Pins Ch-Mt. with M Cable |
| C3 | Connector, 6 Pins Ch-Mt. with F Cable |
| C4 | Connector, 4 Pins Ch-Mt. with F Cable |
| C5 | Connector, 2 Pins Ch-Mt. with F Cable |
| C6 | Screw Terminal |
| C7 | Coax Ch-Mt. Cable |
| C8 | Connector, 2 Pins Ch-Mt. |

Referring to the schematic drawings exhibited in FIGS. 3 and 4 and the parts list of Table 1, it should be noted at this point that exterior circuits, electrical and mechanical devices installed in the vehicle are connected to the central control unit by the type of chassis and in line connectors which provide for different configurations of pins in each connector in order to minimize installation problems and to prevent circuit connection errors.

Switch 57 controls the operating mode of the system and is installed inside of the vehicle and has three positions. In the up position, hereinafter referred to as position A, the switch S7 will cause the central control unit 102 exhibited in FIG. 3 to operate the system in a mode in which only the transmitter 100 and the transmitting antenna 101 are activated. When toggle switch S7 is placed in its central position, hereinafter referred to as position B, the interior alarm system is turned off and will not function under any circumstances. In position C, the down position, the switch S7 will cause the central control unit 102 to activate the unlimited mode which includes the activities in position A, and in addition, the lights 106 of the vehicle, the horn 107 and the tape player 105A. This control switch S7 can be mounted inside of the vehicle at any point which is convenient for the operator—with exposed visibility, accessibility or otherwise.

Referring to FIG. 4, it is obvious that the door's switches DS and other switching devices can activate the central control unit 102 only through the console switch S7.

When switch S7 is in position A and receiving a negative current from any of the door switches DS, except, but not excluding door switch S8 (DS), the alarm system will activate through circuit 16 which is connected to Relay A. Relay A is a time relay in a normally on state and will automatically shut off all current flowing from switch S7 in a prescribed period of time. In other words, Relay A is a timing device and controls the duration of the subsequent activity of the alarm system.

Although switch S8 operates as a door switch in the same manner as any other door switch DS of the vehicle, and its application of a negative current to switch S7 is the same, its purpose and circuits are different. This switching circuit (or duplicated others) has the characteristic of providing for a time delay intended for the operator of a vehicle to enter and leave the vehicle without changing the position of switch S7, and after a "programmed" time interval, this switching circuit will function through switch S7 in the same manner as is the case with any other point of entry switching circuit of the alarm system.

As illustrated in FIGS. 3 and 4, switch S8 is connected to the central control unit 102 by continuing line 17. However, unlike the other door switches with circuits which lead into a junction which in turn lead into S7 through line 13, switch S8 provides a negative current to S7 in the following manner: When switch S8 is closed, i.e., the door is opened, a current will flow through line 17 to switch S3, and depending upon the "programming" of switch S3 (which when in another position, will cause switch S8 to function instantaneously as is the case with all other door switches), switch S3 will allow for the continuation of the negative current derived from switch S8 to flow through line 40 to pin 3 in Relay C. Relay C is a delay timing device which, when contacts are closed, activates a current continuing through switch S7 and thereby causes the alarm system to respond in the same manner as any other door switch.

Further, in conjunction with switch S8, the switch S3 has two other positions. The center or neutral position of switch S8 stops the flow of current from switch S8 to the central control unit 102, thereby allowing entries and exists to and from the door in which it is installed without activating the alarm system. This "programming" of the function of the unit is a convenience for delivery vehicle operators and the like. It is further contemplated that the entire system may not be activated until a short period after the door switch DS signal in order to allow authorized re-entry to the vehicle without the alarm system indicating tampering.

In its third position, switch S3 operates in the exact manner as any of the other instantaneous current switching devices installed in a door. This is illustrated in FIG. 3 by the circuit 52 and continued as 42A.

The power supply for the central control unit is 12 volts, and is derived from the 12-volt battery B1 normally installed in a vehicle or from an auxiliary battery B2 installed within the vehicle. Attention is called to Q2 which is a transistorized switching device. Because of the employment of a resistor R1 to the collector of Q2, battery B2 is not used as an electrical energy supply device unless the vehicle's battery B1 is providing an insufficient output. This switching operation is required when a thief cuts the connecting cables of battery B1 to the vehicle.

It should be pointed out that diodes D1 and D3 are current blocking devices. Diode D1 allows a 12-volt positive current to flow from the vehicle's battery B1 to the alarm system's central control unit 102 and, at the same time, will not allow a misdirected 12-volt DC current generated within the alarm system to interfere with the circuits installed in the vehicle for the purposes of its ordinary operation. Diode D3 is used in this device to block positive current generated when the vehicle's lights 106 are turned on for its normal operations.

The device is further protected by fuse F1 from undesirable high powered voltages or shorts accidentally caused by the vehicle's electrical system or the circuits within this alarm system.

A DC voltage meter M is mounted within the configurations of the central control unit 102 accompanied by a push button switch S2 in order to check the performability of the system's power supply. This "check" can be made regardless to the on or off status of main power switch S1.

Observing other switches and indicator devices on the panel of the central control unit, D2 is a light emitting diode which indicates the on-off status of the main power switch S1.

Switch S4 controls the off-on status of the negative voltage from the motions switch S9 which is attached to the chassis of the vehicle. This motion switch is incorporated in this alarm system to activate the system when the vehicle is moved from any position. For example, the raising of the vehicle to remove a tire or other part will cause switch S9 to connect and send a current to the central control unit. Further, the motion switch S9 is of such configuration that it allows for adjustments to different degrees of motion. In conjunction with the position of switch S7, the circuit activated by the motion switch S9 will momentarily extend the system's antenna 101, cause a short transmission to the receiver 109, and cause the antenna 101 to retract when the vehicle is "bumped" by another vehicle or other slight tampering with the vehicle by an unauthorized person. When console switch S7 is set in its audible position, circuit activity by switch S9 will cause the current flowing through silicon controlled rectifier D4 to keep the unit on until all activating circuits to the central control unit 102 are closed and shut off by Relay A. It is of significance to note that the negative current supplied to SCR D4 is derived from pin 6 in Relay B. This particular circuit is required because pin 6 in Relay B is in a normally off position, which means that it will disengage the flow of current to the main terminal in SCR D4 when Relay A shuts off current to Relay B.

If it is desirable to eliminate the activity created by the motion switch S9, switch S4, mounted on the control unit's panel, is provided and can turn it off.

As is the case with the function of S4 above, switch S10 will include or exclude the use of the tape player 105A used in this alarm system.

Another feature of this system is provided by switch S5 which controls the on and off position of connector S6; terminal C6 is a chassis mounted screw type connector providing for the attachment of any additional negative triggering voltage to activate the alarm system. For example, the owner or operator of a vehicle could desire a light or sound sensitivity device to activate the alarm system. The ease of installing these types of devices is provided for by connector C6.

Referring to FIG. 4, the indicator lamp L1 is mounted on the console inside the vehicle and is illuminated by the activity of the central control unit 102. Once having been activated, this lamp will remain in an illuminated state until the door or other switching device which caused its activity is disengaged.

Still referring to FIG. 4, switch S6 is provided in this system for the accommodation and protection of CB equipment. In the up position, it will cause the antenna A1 to extend to a prescribed operating length, and remain in that state until it is commanded to retract by pushing the switch down. This activity caused by switch S6 will in no way interfere with the other operations of this alarm system.

Although not shown in the schematic drawings exhibited herewith, still another feature of this alarm system provides for a circuit connecting the auxiliary battery B2 to the voltage regulator of the vehicle for the purpose of keeping the auxiliary battery charged.

Although not all the components, circuits and devices necessary for the operation of this alarm system in a vehicle are encompassed in the central control unit, it serves as a central, programmable unit to effect a desired activity to aid in the prevention of the theft or tampering with a vehicle itself, and further the theft or tampering with the contents of the vehicle.

EMBODIMENTS APPLIED TO OTHER PROPERTIES

The foregoing embodiment of this invention was specifically described as it applies to a vehicle; however, it can be applied to other properties. For example, the device can be used to notify the owner or other authority of unauthorized entry to a home, boat, mobile home, rail freight car, airplane, etc., or the tampering with or movement of any property located therein.

In the case of a home or office, switching devices coupled to the transmitter can alert the owner through the receiving device and at the same time create audible and visual activity at the site when an unauthorized entry is made or attempted. This is also the case with airplanes, boats, etc.

One of the outstanding features of this concept is that it allows for many different properties to be monitored at the same time from a central location. An example of this operation is as in the case of preventing theft from rail freight cars when they are stored in a yard on a readily accessible side track.

Another example of the use of this system is to simultaneously monitor a plurality of boats. By monitoring the signals generated from transmitters installed in each boat, one authority can give attention to each and every individual unauthorized entry. And further, with the appropriate switching device, such authority can be notified when the vessel is in distress because of defecting bilge pumps, tide changes, loose lines, etc.

By monitoring the activities of transmitters installed in equipment and other job site installations, one central authority can facilitate security for a general contractor.

Installed in a small appliance such as an office typewriter or other office equipment, with proper sensing and switching, this device can notify a central authority when it is moved, tampered with, etc. For example, it is contemplated that a motion switch, such as a mercury switch could be installed in typewriters to prevent unauthorized removal.

Another feature of this invention is a security system aid for holdups and robberies. For example, by using the audible or silent mode of the device, a security guard or authority can pinpoint the exact station, desk, safe, etc., that activates the alarm system. With the device installed in a brief case, a courier can be located by an authority when the courier or the courier's case activates a distress signal. In other words, the concept of this theft protection device can be used as a location device as well as an alarm device.

Various changes may be made in the details of the invention, as disclosed, without sacrificing the advantages thereof or departing from the scope of the appending claims. Furthermore, although the present invention has been disclosed and discussed with particular regard to its exceptional advantages in terms of detectors, alarms and locating systems, it may be understood that the invention may be employed in several industrial applications wherein remote monitoring is a requirement.

We claim:

1. An alarm system for protecting a property comprising:
   (a) a transmitter for providing a coded signal;
   (b) a transmitting antenna connected to the transmitter for broadcasting the coded signal said transmitting antenna including a motor-driven, telescoping member and said control unit includes a means for extending the member immediately before transmission by the transmitter and means for retracting the member immediately after transmission by the transmitter;
   (c) a sensor system for sensing unauthorized tampering with the property;
   (d) a first power supply for providing electrical energy;
   (e) a control unit for controlling the operation of the transmitter, said control unit connected to the sensor system, the first power supply and the transmitter and having a timing means for activating the transmitter for a limited period of time when the sensor indicates unauthorized tampering;
   (f) a receiving antenna for receiving the coded signal;
   (g) a receiver connected to the receiving antenna for receiving and decoding the coded signal;
   (h) a second power supply connected to the receiver for providing electrical energy; and
   (i) a receiver alarm connected to the receiver power supply and the receiver for providing an alarm whenever the receiver receives and decodes the coded signal whereby unauthorized tampering with the property causes the sensor to indicate to the control unit which activates the timing means permitting the transmitter and the transmitting antenna to broadcast for a limited period of time the coded signal which is received by the receiving antenna and the receiver and decoded, resulting in the actuation of the receiver alarm.

2. An alarm system for protecting a property comprising:
   (a) a transmitter for providing a coded signal;
   (b) a transmitting antenna connected to the transmitter for broadcasting the coded signal;
   (c) a sensor system for sensing unauthorized tampering with the property;
   (d) a first power supply for providing electrical energy;
   (e) an auxiliary power supply;
   (f) a control unit for controlling the operation of the transmitter, said control unit connected to the sensor system, the first power supply, the auxiliary power supply and the transmitter and having a timing means for activating the transmitter for a limited period of time when the sensor indicates unauthorized tampering, said control unit including a transistor having an emitter connected to said first power supply, a collector connected to said second power supply and a grounded resistor and a base connected to the timing means for disconnecting the first power supply and connecting in place thereof the auxiliary power supply whenever said first power supply is not functioning;

(g) a receiving antenna for receiving the coded signal;

(h) a receiver connected to the receiving antenna for receiving and decoding the coded signal; and (i) a receiver alarm connected to the receiver power supply and the receiver for providing an alarm whenever the receiver receives and decodes the coded signal whereby unauthorized tampering with the property causes the sensor to indicate to the control unit which activates the timing means permitting the transmitter and the transmitting antenna to broadcast for a limited period of time the coded signal which is received by the receiving antenna and the receiver and decoded, resulting in the actuation of the receiver alarm.

3. An alarm system for protecting a property comprising:

(a) a transmitter for providing a coded signal;

(b) a transmitting antenna connected to the transmitter for broadcasting the coded signal;

(c) a sensor system including a plurality of vehicle door switches and a motion sensor for sensing unauthorized tampering with the property;

(d) a first power supply for providing electrical energy;

(e) a horn (f) a control unit for controlling the operation of the transmitter, said control unit connected to the sensor system, the first power supply, the horn and the transmitter and having a timing means for activating the transmitter for a limited period of time when the sensor indicates unauthorized tampering, said control unit including a time delay means for delaying activation of at least one of the door switches, thereby allowing an operator to activate the alarm system and exit the vehicle within which the alarm system is installed without activating the transmitter;

(g) a receiving antenna for receiving the coded signal;

(h) a receiver connected to the receiving antenna for receiving and decoding the coded signal;

(i) a second power supply connected to the receiver for providing electrical energy;

(j) a receiver alarm connected to the receiver power supply and the receiver for providing an alarm whenever the receiver receives and decodes the coded signal whereby unauthorized tampering with the property causes the sensor to indicate to the control unit which activates the timing means permitting the transmitter and the transmitting antenna to broadcast for a limited period of time the coded signal which is received by the receiving antenna and the receiver and decoded, resulting in the actuation of the receiver alarm;

(k) means for intermittently actuating the horn during the transmission of the receiver; and (l) said control unit including a three-position switch for allowing said system to be connected to a limited mode wherein only the transmitter is activated, in an unlimited mode wherein the transmitter and the horn are activated, and an off mode wherein none of the system is activated.

4. The alarm system of claim 3 wherein said control unit is connected to a vehicle light and means are provided for intermittently actuating said light during the actuation of the transmitter.

5. The alarm system of claim 4 wherein a tape player including a prerecorded message and a speaker connected to the tape player are connected to said control unit and the tape player is activated during the period of transmission by the transmitter.

6. An alarm system for protecting a property comprising:

(a) a transmitter for providing a coded signal;

(b) a transmitting antenna connected to the transmetter for broadcasting the coded signal;

(c) a sensor system including at least one small appliance sensor for sensing unauthorized tampering with the property;

(d) a first power supply for providing electrical energy;

(e) an auxiliary power supply;

(f) a control unit for controlling the operation of the transmitter, said control unit connected to the sensor system, the first power supply, the auxiliary power supply and the transmitter and having a timing means for activating the transmitter for a limited period of time when the sensor indicates unauthorized tampering, said control unit including a means for disconnecting the first power supply and connecting in place thereof the auxiliary power supply whenever said first power supply is not functioning;

(f) a receiving antenna for receiving the coded signal;

(g) a receiver connected to the receiving antenna for receiving and decoding the coded signal;

(h) a second power supply connected to the receiver for providing electrical energy; and (i) a receiver alarm connected to the receiver power supply and the receiver for providing an alarm whenever the receiver receives and decodes the coded signal whereby unauthorized tampering with the property causes the sensor to indicate to the control unit which activates the timing means permitting the transmitter and the transmitting antenna to broadcast for a limited period of time the coded signal which is received by the receiving antenna and the receiver and decoded, resulting in the actuation of the receiver alarm.

7. The alarm system of claim 6 wherein said means for disconnecting is a transistorized switch.

8. The alarm system of claim 7 wherein said transistorized switch is a transistor having an emitter connected to said first power supply, a collector connected to said second power supply and a grounded resistor and a base connected to the timing means.

9. An alarm system for protecting a property comprising:

(a) a transmitter for providing a coded signal;

(b) a transmitting antenna connected to the transmitter for broadcasting the coded signal;

(c) a sensor system for sensing unauthorized tampering with the property;

(d) a first power supply for providing electrical energy;

(e) a control unit for controlling the operation of the transmitter, said control unit connected to the sensor system, the first power supply and the transmitter and having a timing means for activating the transmitter for a limited period of time when the sensor indicates unauthorized tampering, said control unit including a reset means for preventing a second indication by the alarm system of tampering after a first indication has occurred except when the alarm system has been deactivated and reactivated after the first indication;

(f) a receiving antenna for receiving the coded signal;

(g) a receiver connected to the receiving antenna for receiving and decoding the coded signal;

(h) a second power supply connected to the receiver for providing electrical energy; and (i) a receiver alarm connected to the receiver power supply and the receiver for providing an alarm whenever the receiver receives and decodes the coded signal whereby unauthorized tampering with the property causes the sensor to indicate to the control unit which activates the timing means permitting the transmitter and the transmitting antenna to broadcast for a limited period of time the coded signal which is received by the receiving antenna and the receiver and decoded, resulting in the actuation of the receiver alarm.

10. The alarm system of claim 9 wherein said sensor system includes a plurality of vehicle door switches.

11. The alarm system of claim 10 wherein said control unit includes a time delay means for delaying activation of at least one of the door switches, thereby allowing an operator to activate the alarm system and exit the vehicle within which the alarm system is installed without activating the transmitter.

12. The alarm system of claim 10 wherein said sensor system includes at least one motion sensor.

13. The alarm system of claim 10 wherein a vehicle horn is connected to the control unit and means are provided for intermittently actuating said horn during the transmission of the receiver.

14. The alarm system of claim 13 wherein said control unit includes a three-position switch for allowing said system to be connected to a limited mode wherein only the transmitter is activated, in an unlimited mode wherein the transmitter and the horn are activated, and an off mode wherein none of the system is activated.

15. The alarm system of claim 14 wherein said control unit is connected to a vehicle light and means are provided for intermittently actuating said light during the actuation of the transmitter.

16. The alarm system of claim 8 wherein said control unit includes a three-position switch for allowing said system to be connected to a limited mode wherein only the transmitter is activated, in an unlimited mode wherein the transmitter and the light are activated, and an off mode wherein none of the system is activated.

17. The alarm system of claim 10 wherein a tape player including a prerecorded message and a speaker connected to the tape player are connected to said control unit and the tape player is activated during the period of transmission by the transmitter.

18. The alarm system of claim 17 wherein said control unit includes a three-position switch for allowing said system to be connected to a limited mode wherein only the transmitter is activated, in an unlimited mode wherein the transmitter and the player are activated, and an off mode wherein none of the system is activated.

19. The alarm system of claim 10 wherein said transmitting antenna is a motor-driven, telescoping member and said control unit includes a means for extending the member immediately before transmission by the transmitter and means for retracting the member immediately after transmission by the transmitter.

20. The alarm system of claim 10 wherein an auxiliary power supply is connected to said control unit and said control unit includes a means for disconnecting the first power supply and connecting in place thereof the auxiliary power supply whenever said first power supply is not functioning.

21. The alarm system of claim 20 wherein said means for disconnecting is a transistorized switch.

22. The alarm system of claim 21 wherein said transistorized switch is a transistor having an emitter connected to said first power supply, a collector connected to said second power supply and a grounded resistor and a base connected to the timing means.

23. The alarm system of claim 11 wherein said sensor system includes at least one motion sensor.

24. The alarm system of claim 23 wherein a vehicle horn is connected to the control unit and means are provided for intermittently actuating said horn during the transmission of the receiver.

25. The alarm system of claim 24 wherein said control unit includes a three-position switch for allowing said system to be connected to a limited mode wherein only the transmitter is activated, in an unlimited mode wherein the transmitter and the horn are activated, and an off mode wherein none of the system is activated.

26. The alarm system of claim 25 wherein said control unit is connected to a vehicle light and means are provided for intermittently actuating said light during the actuation of the transmitter.

27. The alarm system of claim 26 wherein a tape player including a prerecorded message and a speaker connected to the tape player are connected to said control unit and the tape player is activated during the period of transmission by the transmitter.

28. The alarm system of claim 3 wherein said control unit includes a reset means for preventing a second indication by the alarm system of tampering after a first indication has occurred except when the alarm system has been deactivated and reactivated after the first indication.

29. The alarm system of claim 28 wherein said transmitting antenna is a motor-driven, telescoping member and said control unit includes a means for extending the member immediately before transmission by the transmitter and means for retracting the member immediately after transmission by the transmitter.

30. The alarm system of claim 29 wherein an auxiliary power supply is connected to said control unit and said control unit includes a means for disconnecting the first power supply and connecting in place thereof the auxiliary power supply whenever said first power supply is not functioning.

31. The alarm system of claim 30 wherein said means for disconnecting is a transistorized switch.

32. The alarm system of claim 31 wherein said transistorized switch is a transistor having an emitter connected to said first power supply, a collector connected to said second power supply and a grounded resistor and a base connected to the timing means.

33. The alarm system of claim 9 wherein said sensor system includes at least one small appliance sensor.

34. The alarm system of claim 33 wherein said sensor system includes at least one motion sensor.

35. The alarm system of claim 33 wherein said control unit includes a three-position switch for allowing said system to be connected to a limited mode wherein only the transmitter is activated, in an unlimited mode wherein all portions of the system are activated, and an off mode wherein none of the system is activated.

36. The alarm system of claim 36 wherein said control unit includes a reset means for preventing a second indication by the alarm system of tampering after a first indication has occurred except when the alarm system has been deactivated and reactivated after the first indication.

37. The alarm system of claim 33 wherein an auxiliary power supply is connected to said control unit and said control unit includes a means for disconnecting the first power supply and connecting in place thereof the auxiliary power supply whenever said first power supply is not functioning.

38. The alarm system of claim 37 wherein said means for disconnecting is a transistorized switch.

39. The alarm system of claim 38 wherein said transistorized switch is a transistor having an emitter connected to said first power supply, a collector connected to said second power supply and a grounded resistor and a base connected to the timing means.

* * * * *